July 24, 1956

S. SCHNELL 2,755,889

SELF-CENTERING COMPOUND BRAKE

Filed Oct. 6, 1954

INVENTOR
STEVE SCHNELL
By Gravely, Leeder, Woodruff & Wiles
ATTORNEYS.

July 24, 1956     S. SCHNELL     2,755,889
SELF-CENTERING COMPOUND BRAKE
Filed Oct. 6, 1954     2 Sheets-Sheet 2
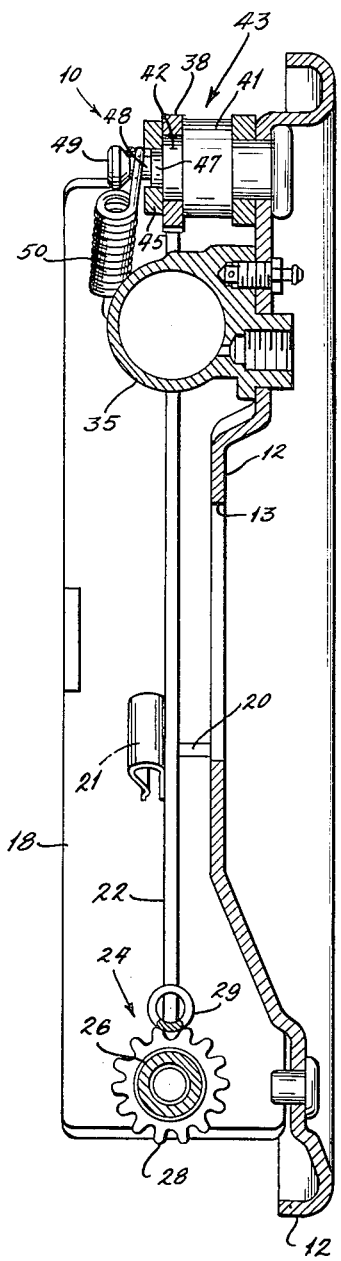
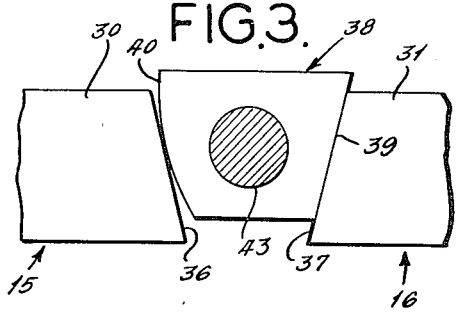
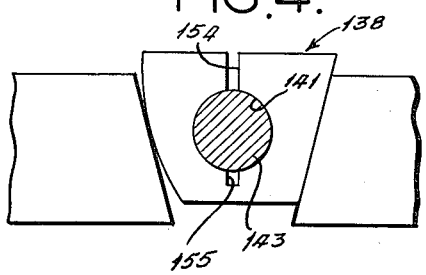
INVENTOR
STEVE SCHNELL
By Gravely, Lieder, Woodruff & Wills
ATTORNEYS.

United States Patent Office 2,755,889
Patented July 24, 1956

2,755,889

SELF-CENTERING COMPOUND BRAKE

Steve Schnell, St. Louis, Mo., assignor to Wagner Electric Corporation, St. Louis, Mo., a corporation of Delaware Application October 6, 1954, Serial No. 460,712

7 Claims. (Cl. 188—78)

The present invention relates generally to automotive braking systems and more particularly to a compound braking mechanism which is self-centering in both the forward and reverse directions of movement.

It is an object of the present invention to provide a novel compound braking mechanism which is self-centering in both directions of rotation, i. e., a self-centering compound braking mechanism in the forward direction of rotation, and a self-centering compound braking mechanism in the reverse or rearward direction of rotation. More particularly, it is an object to provide anchor means for both shoes of a compound mechanism, which will result in the anchoring shoe being self-centering, regardless of the direction of rotation. Specifically, it is an object to provide a novel anchor block for use with both shoes and which will result in the aforementioned self-centering of the anchoring shoe, regardless of the direction of rotation.

Another object of the present invention is to provide a self-centering compound braking mechanism in which the brake shoes are interchangeable.

Another object is to provide such a mechanism employing a single anchor block for both shoes, which eliminates the necessity of repositioning the anchor block after a braking application in the reverse direction of rotation.

A further object of the invention is to provide a self-centering compound braking mechanism employing a single anchor block for both shoes in which the effective input during reverse braking is maintained at a predetermined value under given conditions.

Further objects and advantages of the present invention will be apparent from the detailed description of the device constructed in accordance with the teachings of the present invention.

Briefly, the invention comprises an anchor block with opposed faces pivotally mounted on a backing plate between adjacent ends of opposed brake shoes, the ends of the brake shoes having flat surfaces; one face of the anchor block being flat to provide a surface to surface contact with the end of the shoe adjacent thereto, and the other face being curved to provide a line contact with the end of the other brake shoe, said line of contact remaining substantially the same distance from the center of the backing plate regardless of the position of the anchor block during reverse braking.

In the drawing:

Fig. 2 is a vertical cross-sectional view taken on the line 2—2 in Fig. 1,

Fig. 3 is an enlarged elevational view of the anchor block and the ends of the brake shoe adjacent thereto, and Fig. 4 is an enlarged elevational view of a modified anchor block.

Figure 1:
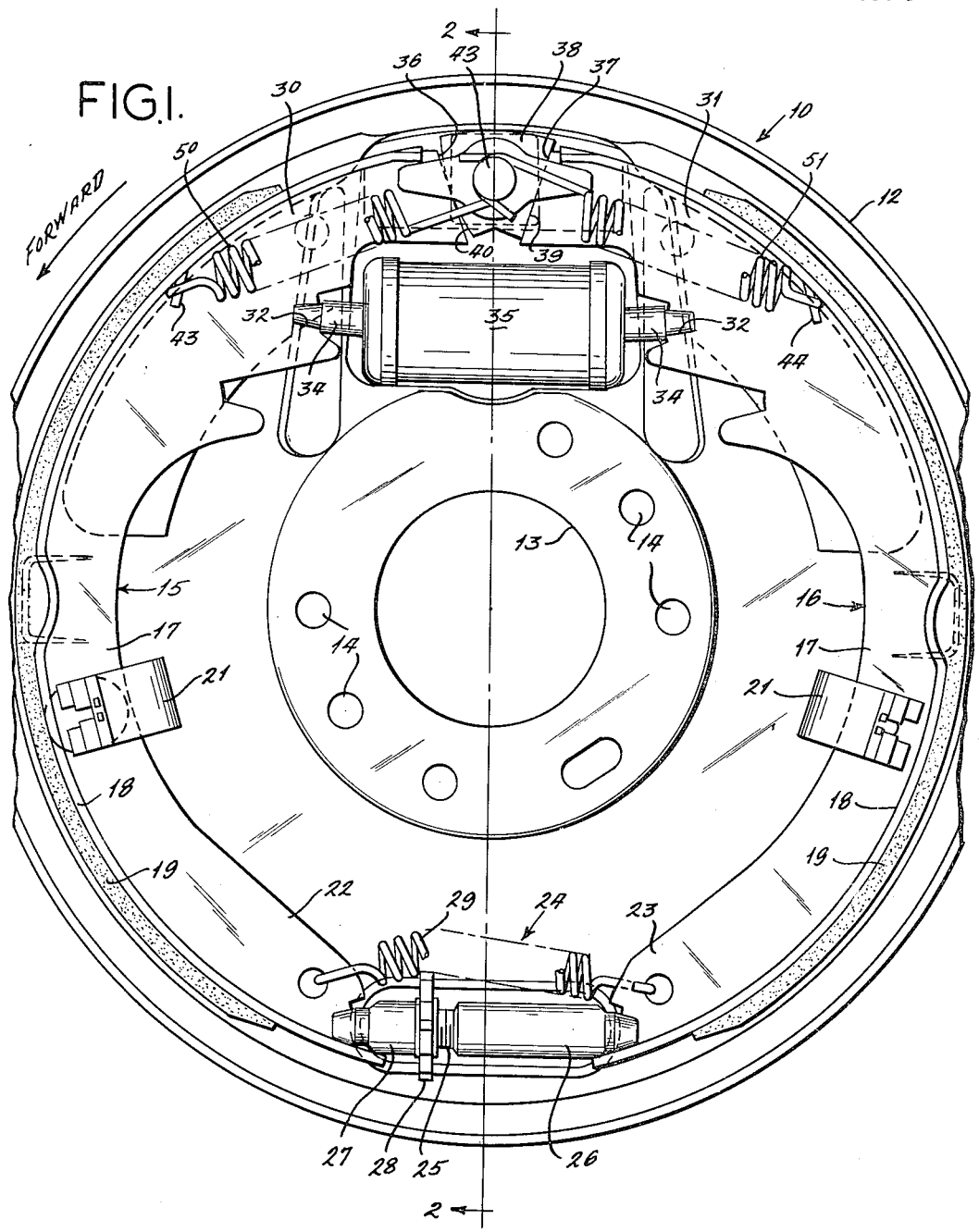
Fig. 1 is an elevational view of a compound braking mechanism constructed in accordance with the teachings of the present invention.

Referring to the drawings more particularly by reference numerals, specifically Fig. 1, the numeral 10 indicates a wheel brake assembly embodying the teachings of the present invention, and which includes a backing plate 12 having an annular aperture 13 through which extends an axle or similar supporting structure of a vehicle.

A plurality of smaller annular apertures 14 are provided in the backing plate 12 adjacent the larger aperture 13, for securing the backing plate to the axle or similar supporting structure.

The wheel brake assembly 10 also includes brake shoes 15 and 16, each of which contains a web 17 and a table 18 to which a friction lining 19 is secured.

Referring to Fig. 2, the shoes 15 and 16 are supported on the backing plate 12 and are maintained in sliding engagement therewith by guide pins 20 and guide clips 21 so as to maintain the shoes in alignment with a co-operating brake drum (not shown).

As shown in Fig. 1, shoe 15 includes a heel portion 22 which is connected with a toe portion 23 of the shoe 16 by means of a conventional adjustment member 24 disposed therebetween.

The adjustment member 24 includes left and right hand screws 25 and 26; the left hand screw 26 being threaded into a sleeve nut 27. A star wheel 28 is provided on the left hand screw 25 for adjusting the positions of the left and right hand screws and a coiled spring 29 is connected between the heel 22 of the shoe 15 and the toe 23 of the shoe 16 so as to maintain the engagement between said shoes and the adjustment member 24. The spring 29 also engages the star wheel 28 to prevent undesired rotation thereof so that the adjusted positions of the shoes are maintained.

The shoe 15 also includes a toe portion 30 and the shoe 16 a heel portion 31, and below said toe and heel portions, opposed slots 32 are formed in the web 17 of each of the shoes to cooperate with slots formed in the ends of push rods 34.

The push rods 34 are supported in a conventional wheel cylinder 35 which is mounted on the backing plate 12.

The toe 30 of the shoe 15 and the heel 31 of the shoe 16 are provided with flat inclined abutment surfaces 36 and 37, respectively (Fig. 3). When the shoes are in the inoperative position, the surfaces 36 and 37 abut a keystone-shape anchor block 38. As shown in Fig. 3, the right side of the anchor block contains a flat surface 39 formed to complement the flat inclined surface 37 of the heel 31 so as to provide a surface to surface contact therewith. The left side of the block 38 is slightly convex or arcuate so as to provide a surface 40 which, in the inoperative position, abuts the flat inclined surface 36 of the toe 30 so as to establish a line contact therewith.

As shown in Fig. 2, the anchor block 38 is mounted on an anchor pin 43 which is fastened to the backing plate 12. The pin 43 includes a body portion 41, a reduced portion 42 which receives the anchor block 38, and a further reduced portion 47 on which is mounted a shoe guide 45 which abuts the anchor block 38. Extending outwardly beyond the further reduced portion 47 is a neck 48 and a bevelled head 49.

Hooks 43 and 44 (Fig. 1) are provided in the table portions 18 of the shoes 15 and 16, respectively, and coiled return springs 50 and 51 are connected between the neck 48 and the hooks 43 and 44 respectively, for returning the shoes to the inoperative position after the pressure in the wheel cylinder is released.

The bevelled head 49 of the anchor pin 43 wedges the ends of the springs 50 and 51 positioned thereon into frictional engagement with the shoe guide 45 which in turn bears up on the anchor block 38, thereby preventing the latter from rotating when the shoes 15 and 16 are disengaged from the anchor block 38.

*Operation*

The operation of the device will first be described assuming that the brake drum (not shown) is rotating in the counterclockwise or forward direction as indicated by the arrow in Fig. 1.

Fluid pressure from a conventional source (not shown) is introduced into the wheel cylinder 35 thereby causing the push rod 34 which is in engagement with the shoe 15, to move the toe or top portion 30 thereof into contact with the brake drum. Because the drum rotation is in the direction of the movement of the toe 30, a self-energizing effect is produced which causes the input force to the shoe 15 to be multiplied and transmitted to the toe 23 of the shoe 16 through the adjusting member 24, the heel 31 of the shoe 16 engaging the anchor block 38. Inasmuch as the additional braking force developed by the shoe 16 augments the braking force developed by the shoe 15, it follows that the sum of the braking forces of both shoes is borne by the anchor block 38.

When the rotation of the drum is in the forward or counterclockwise direction, the shoe 16 is the so-called anchoring shoe and the end 23 is the toe portion thereof and the end 31 is the heel portion. On the other hand, when the rotation of the drum is in the opposite direction, i. e., the clockwise direction, the shoe 15 becomes the anchoring shoe and the portion 22 thereof is referred to as the toe portion and the portion 20 as the heel portion.

In compound brakes which are not self-centering, excessive drum distortion, as results from a severe braking application, causes the brake shoes to wedge or lock with the brake drum. This locking results from unequal forces acting on the anchoring shoe and is generally due to excessive forces between the drum and the toe of the shoe or between the drum and the heel of the shoe.

However, in the construction embodying the teachings of the present invention, during a braking application in the forward direction, the heel 31 of the anchoring shoe 16 slides on the surface 37 of the anchor block 38 so as to move the entire shoe radially outwardly into engagement with the brake drum (and rotate the anchor block when necessary), whereby the forces over the entire surface of the friction lining 19 are equalized.

When the forces exerted by the rod 34 of the brake cylinder 35 are removed, as by releasing the pressure within the wheel cylinder 35, the spring 50 causes a general movement of the shoes 16 and 15 and the connecting member 24 in the clockwise direction. Because the heel 31 of the shoe 16 is maintained in engagement with the surface 39 of the anchor block 38 by the spring 51, the heel 31 slides inwardly, and when necessary, rotates the anchor block 38 to its original position. Consequently, when the toe end 30 of the shoe 15 is returned to engagement with the anchor block 38 the surface 36 resumes the same effective anchoring line contact with the surface 40, as prevailed prior to the braking action in the forward direction.

In a reverse braking application, i. e., opposite to the direction of the arrow in Fig. 1, increased fluid pressure in the wheel cylinder 35 causes the push rod 34 which is in engagement with the shoe 16 to move the toe 31 thereof into contact with the brake drum. Because the rotation of the drum is in the direction of the movement of the toe 31, a self-energizing effect results which causes the input to the shoe 16 to be multiplied and transferred to the toe 22 of the shoe 15 through the adjusting member 24, thereby energizing the shoe 15 and increasing the braking torque. As described hereinabove, the sum of the torque of forces on both shoes is borne by the anchor block 38 which has a line contact with the anchoring shoe 15. However, because the torque or reverse braking is normally not nearly so great as that of forward braking, a line contact between the shoe 15 and the anchor block 38 will suffice, whereas a surface contact must be maintained between the shoe 16 and the anchor block to support the greater forward braking force.

In the event drum distortion occurs during the reverse braking operation so as to cause unequal forces on the anchoring shoe 15 which tend to lock it with the brake drum, these forces cause a relative sliding and possible rolling movement between the surface 36 of the shoe 15 and the surface 40 of the anchor block 38 so as to center the shoe. Consequently, the forces which are normally concentrated near the toe 22 of the shoe 15 are more evenly distributed over the area of the lining 19 which is in engagement with the braking drum, thereby preventing the locking of the wheel brake assembly.

When the shoe 15 is thus centered with respect to the brake drum, the effective input to the shoe is maintained at a predetermined value because the line of contact between the heel 30 of the shoe 15 and the anchor block 38 remains at substantially the same distance from the center of the backing plate 12 even though there is relative movement between the surfaces 36 and 40.

After the reverse braking application has been completed, the brake shoe 15 is returned to its inoperative or released position, by reasons of the return spring 51 moving the shoes and the adjustment member 24 in the counter-clockwise direction.

If the left side of the anchor block 38 were a flat surface similar to the right side thereof, and the surface of the heel 30 of the shoe 15 were rounded, the effective input to the shoe 15 would change during the reverse braking more than when the present construction is employed, and would increase or decrease depending upon the direction of movement of the heel 30 relative to the anchor block 38. Stating it differently, if the surface 40 of the anchor block 38 were flat and the end surface of the shoe 15 in contact therewith were convex, any radial movement of the heel end 30 during the centering operation would change the distance between the center of the backing plate 12 and the line of contact between the shoe and the anchor block, and thereby change the effective input to the shoe.

Another possible construction which is not advocated would be to have a flat surface on the left side of the anchor block 38, similar to the flat surface on the right side thereof and to have a cooperating flat surface on the heel 30 of the shoe 15. However, with such a construction, the two flat surfaces would have to be parallel at the time the heel portion engaged the anchor block, as during the reverse braking operation, otherwise there would be an objectionable "clicking" or "slapping" sound caused by the block pivoting into full surface contact with the heel portion of the shoe.

A modified anchor block 138 is shown in Fig. 4. In the modified construction, the keystone-shaped anchor block is provided with a bore 141 for receiving an anchor pin 143 and a vertical slot 154 is formed in the upper portion of the block so as to extend from the bore 141 to the upper surface of said block. A second slot 155 extends downwardly from the lowermost portion of the bore 141 to adjacent the bottom surface of the block. The slots 154 and 155 aid in securing a frictional engagement between the anchor block and the cooperating anchor pin 143 so as to prevent rotation of the block 138 when the shoes 15 and 16 are disengaged therefrom. In order to obtain a close fit between the blocks and the pin, the block 138 is slightly compressed following the milling of the slots 154 and 155 so that the bore 141 is slightly reduced in size. Thus, when the block 138 is assembled on the pin 141, the two sides of the block must be spread apart and there is a tendency for it to spring back to its original or constricted shape, thereby exerting a gripping action on the anchor pin.

Thus it is apparent that there has been provided a novel self-centering compound braking mechanism which fulfils all of the objects and advantages sought therefor.

The anchoring shoe of the compound mechanism is self-centering regardless of the direction of rotation, and the braking action is accompanied by very little noise, if any.

Also, during the reverse braking operation, because the line of contact between the anchoring shoe and the anchor block remains the same distance from the center of the backing plate, the effective input is maintained substantially constant under given conditions.

In addition, the single anchor block for both shoes provides a very economical construction, and the brake shoes themselves are interchangeable.

It is to be understood that the foregoing description and the accompanying drawings have been given only by way of illustration and example, and that changes and alterations in the present disclosure, which will be readily apparent to one skilled in the art, are contemplated as within the scope of the present invention which is limited only by the claims which follow.

What is claimed is:

1. In a braking mechanism comprising a backing plate, a plurality of brake shoes for cooperation with a brake drum, said brake shoes being slidably mounted on said backing plate, adjusting means interposed between adjacent ends of said brake shoes, a fluid motor for moving said brake shoes into engagement with said drum; rotatable anchoring means for said brake shoes arranged diametrically opposite said adjusting means and carried on said backing plate, said anchoring means being provided with a flat surface on one side for cooperating with the end of one of said brake shoes, and an arcuate surface on an opposite side for cooperating with the end of the other of said brake shoes, and resilient means for normally holding said brake shoes in engagement with said rotatable anchoring means.

2. In a braking mechanism including a backing plate, an anchoring means, a pair of brake shoes carried on said backing plate having free ends removably engageable with said anchoring means, adjusting means diametrically opposite said anchoring means for connecting adjacent ends of said brake shoes, return means for normally holding the free ends of said brake shoes in engagement with said anchoring means, means for actuating one of said brake shoes, said anchoring means comprising an anchor block, an aperture in said anchor block, a vertical slot intersecting said aperture, an anchor pin received in said aperture and frictionally engaged thereby, said pin being fixedly secured to said backing plate, said anchor block having a right side provided with a substantial flat surface engageable with a flat surface on one of the cooperating free ends of said brake shoes and a left side provided with a rounded surface engageable with a flat surface on the cooperating free end of the other of said brake shoes.

3. In a braking mechanism having a backing plate, a pair of symmetrical brake shoes engageable with a brake drum, adjusting means for connecting adjacent ends of said brake shoes, means for actuating one of said brake shoes, anchoring means for said brake shoes comprising an anchor block rotatably mounted on an anchor pin supported by said backing plate, said anchor block having a flat surface formed on one side thereof for cooperable engagement with a flat surface on the free end of one of said brake shoes and a rounded surface on an opposite side for cooperable engagement with a flat surface on the free end of the other of said brake shoes, and resilient means for returning said brake shoes to their inoperative position and for preventing undesirable rotation of said anchor block.

4. In a braking mechanism, the combination of a backing plate; at least two arcuate brake shoes movably mounted on said backing plate in opposed relationship to provide two sets of opposed ends and movable into braking engagement with a brake drum which is rotatable in both a forward and a reverse direction; motor means for moving the brake shoes into engagement with the brake drum; means connecting together one set of opposed ends; and an anchor block having opposed side faces pivotally mounted on said backing plate between the other opposed ends for engagement therewith, the ends of the shoes adjacent to the anchor block having flat surfaces, one of the side faces of the block having a flat surface complementary to the flat surface of the end of the shoe adjacent thereto and the other face of the block being arcuate in shape.

5. In a braking mechanism, the combination of a backing plate; at least two arcuate brake shoes movably mounted on said backing plate in opposed relationship to provide two sets of opposed ends and movable into braking engagement with a brake drum which is rotatable in both a forward and a reverse direction; motor means for moving the brake shoes into engagement with the brake drum; means connecting together one set of opposed ends; and an anchor block having opposed side faces pivotally mounted on said backing plate between the other opposed ends for engagement therewith, the ends of the shoes adjacent to the anchor block having flat surfaces, the side face of the block adjacent to the shoe which becomes the anchoring shoe when the brake drum rotates in the reverse direction having an arcuate surface to provide a line contact with the flat surface at the end of said shoe.

6. In a braking mechanism, the combination of a backing plate; at least two arcuate brake shoes movably mounted on said backing plate in opposed relationship to provide two sets of opposed ends and movable into braking engagement with a brake drum which is rotatable in both a forward and a reverse direction; motor means for moving the brake shoes into engagement with the brake drum; means connecting together one set of opposed ends; and an anchor block having opposed side faces pivotally mounted on said backing plate between the other opposed ends for engagement therewith, the ends of the shoes adjacent to the anchor block having flat surfaces, the side face of the block adjacent to the shoe which becomes the anchoring shoe when the brake drum rotates in the reverse direction having an arcuate surface to provide a line contact with the flat surface at the end of said shoe, and the other side face of the block having a flat surface complementary to the flat surface of the end of the shoe which becomes the anchoring shoe during forward rotation of the brake drum.

7. In a braking mechanism, the combination of a backing plate; at least two arcuate brake shoes movably mounted on said backing plate in opposed relationship to provide two sets of opposed ends and movable into braking engagement with a brake drum which is rotatable in both a forward and a reverse direction; motor means for moving the brake shoes into engagement with the brake drum; means connecting together one set of opposed ends; and an anchor block having opposed side faces pivotally mounted on said backing plate between the other opposed ends for engagement therewith, the ends of the shoes adjacent to the anchor block having flat surfaces, the side face of the block adjacent to the shoe which becomes the anchoring shoe when the brake drum rotates in the reverse direction being curved to provide a line contact between the end of said shoe and the block and which remains at substantially the same distance from the center of the backing plate during the reverse braking operation.

References Cited in the file of this patent

UNITED STATES PATENTS 2,190,978    Dick                Feb. 20, 1940